March 3, 1964 G. N. HARVEY ETAL 3,122,841
CORRECTION OF MAGNETIC COMPASSES
Filed June 5, 1961
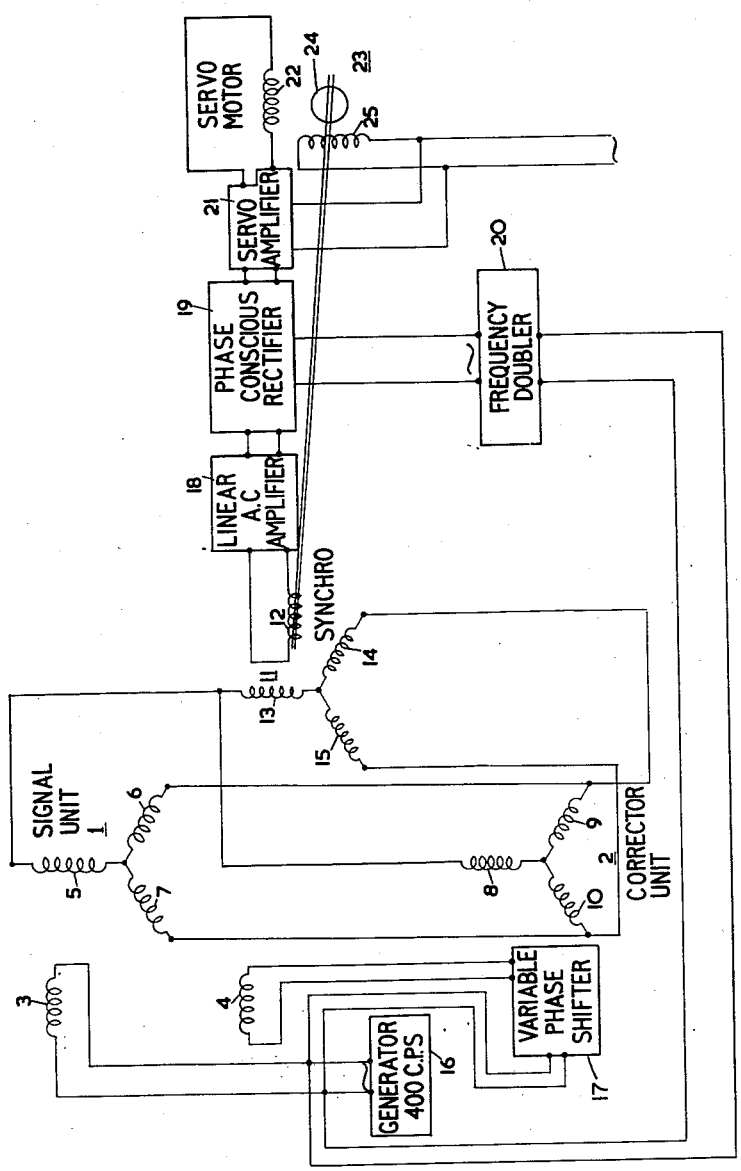
Inventors
*Gilbert N. Harvey*
By *John C. Moden*
Attorney United States Patent Office  3,122,841
Patented Mar. 3, 1964

3,122,841
CORRECTION OF MAGNETIC COMPASSES
Gilbert Nathaniel Harvey, "Barnards," Buckinghamshire, Colnbrook, England, and John Carol Moden, 25 Rosecroft Gardens, Whitton, Middlesex, England
Filed June 5, 1961, Ser. No. 114,819
8 Claims. (Cl. 33—224)

This invention relates to magnetic compasses for use on structures consisting of or comprising magnetic material, such as steel vehicles, ships or aircraft.

Various methods have previously been proposed to reduce the deviation due to the magnetic effects of the structure on which the compass is mounted.

In the specification of British Patent No. 775,440 and in the corresponding U.S. Patent No. 2,900,736 there is described a magnetic compass system for use on structures of or containing magnetic material, and this system comprises two magnetic detector units arranged one at each of two points at which the deviating fields bear a substantially constant ratio and are parallel to each other under all reasonable conditions of magnetisation of the body whether transient or permanent. The said units are such as to produce outputs of a form related to the magnetic heading of the structure. The outputs of the units are fed to an automatic device which provides a mechanical output for operating a directional indicator and an electrical output consisting of an error voltage from the unit at the point of lesser deviation (e.g. that at the farther point from the magnetic structure) corrected by the subtraction from the said voltage of a suitable proportion of the error voltage from the unit at the point of greater deviation. This subtraction gives an error voltage which is reduced in strength compared with that of either unit separately but corrected for deviation, and this error voltage is fed to means for varying the mechanical output of the automatic device.

The two magnetic detector units just referred to may be mounted on a relatively short boom extending from the vehicle or other structure. The said units provide outputs of a form related to the magnetic heading of the structure. In practice there may be employed magnetic detector units comprising an electrically excited element with pick-off coils, forming a flux valve and providing a two or three vector output. One specific form of magnetic detector unit of this type which is particularly suitable for the purpose of the invention is the detector unit of the MK.4 series of gyro-magnetic compasses (also known as the G 4B and G 4F compasses) used by the Royal Air Force. This magnetic detector unit is maintained horizontal by mounting it in a pendulous holder which is free to swing up to 25° in pitch and roll but is fixed to the main structure in azimuth. The unit houses a fixed sensitive element resembling a wheel with three spokes spaced 120° apart radiating from a central core or hub, the ring being divided between the spokes so that each section of the rim forms a flux collector horn for its respective spoke. An exciter or primary coil is wound around the central core or hub, the axis of which is vertical, and a pick-off coil is wound round each spoke which comprises a pair of spaced apart magnetically similar cores extending horizontally from the central core or hub and opened out away from each other at their inner ends so that these embrace the core or hub at its opposite ends. The exciter coil is, for example, supplied with a 400 cycles per second single phase alternating current which is sufficient to induce a saturating magnetic flux in each spoke, whereby the parts of this which constitute the core of the pick-off coil alternately and oppositely change their magnetic polarity so as each to induce in the pick-off coil an alternating current of 400 cycles equal to but 180° out of phase with that induced by the other core part. These two currents thus cancel each other, but, when the pick-off coil is turned from a position in which its axis is at right angles to the earth's magnetic field, the flux produced by the exciter coil in each part of the core of the pick-off coil will alternately be additive and subtractive to that produced by the field, the effect of which will be to produce in the pick-off coil an alternating current of 800 cycles per second. The outputs from the three pick-off coils will constitute a three vector output such as previously referred to.

One arrangement described in the specification of British Patent No. 775,440 includes two magnetic detector units each operating an individual synchro. The selected points at which the said magnetic units are mounted will hereinafter be referred to as the "points specified."

According to the present invention, on a transporter, e.g. a land vehicle, ship, or aircraft, instead of employing two synchros a single synchro is used which is arranged to be energised by the joint action of the detector units. A servo motor is mechanically coupled to the rotor of the synchro so as to be capable of positively rotating it, and phase conscious means is provided to control the output torque of this servo motor. The arrangement is such that changes in magnitude of the electrical output of the synchro or changes in the phase relationship of said electrical output with respect to a reference voltage or changes in both magnitude and phase of said electrical output will cause the servo motor to turn the synchro rotor into an angular position where the electrical output from this rotor will cause no torque from the servo motor. The system is capable of being so balanced that the apportioned effectiveness of the output signals from each of the said detectors will be such that the algebraic sum of these outputs will result in the angular position into which the servo motor will turn the synchro rotor providing a corrected indication of the appropriate heading of the transporter.

In the ensuing description one of the magnetic detector units may be regarded as a signal unit and the other as a corrector unit. When the detector units are mounted on a boom projecting from the transporter, the one farther away from the transporter will usually be considered to be the signal unit.

Let the horizontal component of the earth's magnetic field at the location of the corrector unit be represented by the vector $\bar{H}$ and the horizontal component of the deviation field due to the vehicle at this position by the vector $\bar{D}$, then the corresponding components at the signal unit location are $\bar{H}$ and $c\bar{D}$, respectively, where $c$ is a scalar constant.

If the signal and corrector flux valves are connected in parallel to the stator windings of a synchro and are, for example, excited at voltages the instantaneous values of which are $E \sin wt$ and $$E \sin \left(wt + \frac{\pi}{2} + \phi\right)$$

respectively, the second harmonic voltages simultaneously present across the synchro rotor will be:

Due to signal unit:
  $K(\bar{H}.\bar{e}) \sin 2wt$
  $Kc(\bar{D}.\bar{e}) \sin 2wt$ Due to corrector unit:
  $K^1(\bar{H}.\bar{e}) \sin (2wt+\pi+2\phi)$
  $K^1(\bar{D}.\bar{e}) \sin (2wt+\pi+2\phi)$ The signals due to the corrector unit differ in time phase from those due to the signal unit because of the difference in time phase of the respective excitation voltages; $K$ and $K^1$ are constants of proportionality and $\bar{e}$ is a unit vector directed along the magnetic axis of the synchro rotor winding. The dot in the bracket indicates a scalar product of vectors.

By adjusting the phase relationship between the excitation voltages for the signal and corrector units, it is possible to obtain a voltage across the synchro rotor which can be utilised in controlling means whereby a torque can be applied to this rotor to rotate it to a position where an indicator with which it is associated will give a substantially correct compass reading. In order to enable this phase adjustment to be effected (i.e. $\phi$ to be varied) at will, a phase shifter may be provided to vary the phase of the excitation voltage of the corrector unit with reference to that of the signal unit.

One method of utilising the voltage from the synchro rotor, in carrying out the invention, consists in feeding it to a linear A.C. amplifier and then into a P.C.R. (phase conscious rectifier), the reference or switching voltage of which is arranged to be $E^1 \sin 2wt$ ($E^1$ being large in comparison to the previously mentioned instantaneous value of E), in which case the D.C. output from the P.C.R. will be:

Due to signal unit:
$K^{11}.K(\overline{H}.\bar{e})$
$K^{11}.Kc(\overline{D}.\bar{e})$ Due to corrector unit:
$K^{11}K^1(\overline{H}.\bar{e}) \cos(\pi+2\phi)$
$=-K^{11}.K^1(\overline{H}.\bar{e}) \cos 2\phi$
$K^{11}K^1(\overline{D}.\bar{e}) \cos(\pi+2\phi)$
$=-K^{11}.K^1(\overline{D}.\bar{e}) \cos 2\phi$ where $K^{11}$ is again a constant of proportionality. $\phi$ can be varied until $\cos 2\phi$ is equal to $$\frac{cK}{K^1}$$

Then the D.C. output from the P.C.R. becomes equal to $K^{11}.K(1-c)(\overline{H}.\bar{e})$ and is independent of the deviation field due to the vehicle. Thus, if this D.C. output is applied to an orthodox servo-amplifier and motor, the motor of which is mechanically coupled to the synchro motor, the servo motor will run until $$K^{11}.K(1-c)(\overline{H}.\bar{e})=0$$

This expression is satisfied when $\bar{e}$ is at right angles to $\overline{H}$, i.e., the rotor settles in a position which can be used to indicate the direction of the earth's magnetic field.

If desired a servo motor having phase conscious characteristics may be employed, for example a two phase alternating current induction motor, in order to avoid the use of separate phase conscious means.

Although the invention has been described as employing signal and corrector units having three arms, use could be made of similar units having, for example, two arms, in conjunction with an appropriate synchro.

One embodiment of the invention will now be described, by way of example, with reference to the accompanying schematic diagram.

In the arrangement shown in the diagram, 1 and 2 indicate magnetic detectors. The detector 1 will hereinafter be referred to as the "signal unit" and the detector 2 as the "corrector unit." The respective excitation windings of the signal and corrector units are indicated by 3 and 4, and the three output windings by 5, 6, 7 and 8, 9, 10.

The coils 5, 6, 7 of the signal unit 1 are connected to the coils 13, 14, 15 of a synchro 11 having a rotor 12, and the corresponding output coils 8, 9, 10 of the corrector unit 2 are also connected to the coils 13, 14, 15.

The excitation coil 3 of the signal unit is connected to the output of an alternating current generator 16 which applies a voltage at a frequency of 400 cycles per second across this coil, and the excitation coil 4 of the corrector unit 2 is connected to a variable phase shifter 17, the input from which phase shifter is connected to the generator 16, so that there will be a phase displacement of the voltage applied to the excitation coil 4 with respect to that applied to the excitation coil 3. This arrangement is such that the 800 cycles per second frequency signals due to the corrector unit differ in time phase from those of the signal unit, because of the difference in time phase of the respective excitation voltages, which would be as hereinbefore stated.

The rotor 12 of the synchro is connected to the input of a linear alternating current amplifier 18, the output from which amplifier feeds into a phase conscious rectifier 19 to which is fed, from a frequency doubler 20, a reference or switching voltage, the input of the frequency doubler being connected to the generator 16. The direct current output from the phase conscious rectifier is fed into a servo amplifier 21 to control the phase and strength of the alternating voltage output of this amplifier in relation to the reference winding 22 of a two phase servo motor 23 the rotor 24 of which is mechanically connected, through a reduction gear (not shown), to the rotor 12 of the synchro. The other phase winding 25, of the servo motor 23 is connected to the same alternating current source that supplies the servo amplifier 21. The output of the servo amplifier 21 is applied to this servo motor so that this will always turn the rotor 12 into an angular position where it will provide a corrected indication of the heading of the vehicle.

It will be readily understood that the system may alternatively be made to operate by energising the exciter coil 4, say 45 electrical degrees, out of phase with the exciter coil 3 and feeding the frequency doubler 20 from a variable phase shifter (not shown), which phase shifter could then be adjusted until the system would function satisfactorily for all headings of the vehicle.

We claim:

1. A magnetic compass system comprising a pair of magnetic detector units carried by a transporter having deviating fields, which detector units re arranged one at each of two points at which the deviating fields bear a substantially constant ratio and are parallel to each other, an excitation circuit for each detector unit, a single synchro the stator windings of which are connected into the system to be energised by the joint action of the output signals of the said detector units, a servo motor mechanically coupled to the synchro to rotate it positively, phase conscious means for controlling the output of the servo motor, so that changes in the effective electrical output of the synchro will cause the servo motor to turn the rotor into an angular position where the output from the said synchro rotor will cause no torque from the servo motor, and means whereby the phase angle of the voltage in the excitation circuit of one of the detector units may be adjusted to achieve a relation between the output signals of these units which will be such that the algebraic sum of said output signals will result in the angular postion into which the servo motor will turn the synchro rotor providing a corrected indication of the heading of the transporter.

2. A magnetic compass system comprising a pair of detector units carried by a transporter having deviating fields, which detector units are arranged one at each of two points at which the deviating fields bear a substantially constant ratio and are parallel to each other, an excitation circuit for each detector unit, a single synchro the stator windings of which are connected into the system to be energised by the joint action of the output signals of said detector units, a servo motor mechanically coupled to the rotor of the synchro to rotate it positively, and a phase conscious rectifier for controlling the output torque of the servo motor, so that changes in the effective electrical output of the synchro will cause the servo motor to turn the synchro rotor into an angular postion where the electrical output from the said synchro rotor will cause no torque from the servo motor, and means whereby the phase angle of the voltage in the excitation circuit of one of the detector units may be adjusted to achieve a relation between the output signals of these units which will be such that the algebraic sum of said output signals will result in the angular position into which the servo motor will turn the synchro rotor providing a corrected indication of the heading of the transporter.

3. A magnetic compass system comprising a pair of magnetic detector units carried by a transporter having deviating fields, which detector units are arranged one at each of two points at which the deviating fields bear a substantially constant ratio and are parallel to each other, an excitation circuit for each detector unit, a single synchro the stator windings of which are connected into the system to be energised by the joint action of the output signals of said detector units, a phase conscious servo motor mechanically coupled to the rotor of the synchro to rotate it positively and so that changes in the effective electrical output of the synchro will cause the servo motor to turn the synchro rotor into an angular position where the electrical output from the said synchro will cause no torque from the servo motor, and means whereby the phase angle of the voltage in the excitation circuit of one of the detector units may be adjusted to achieve a relationship between the effective output signals of these units which will be such that the algebraic sum of these output signals will result in the angular position into which the servo motor will turn the synchro rotor providing a corrected indication of the heading of the transporter.

4. A magnetic compass system comprising a pair of magnetic detector units carried by a transporter having deviating fields, which detector units are arranged one at each of two points at which the deviating fields bear a substantially constant ratio and are parallel to each other, an excitation circuit for each detector unit, a single synchro the stator windings of which are connected into the system to be energized by the joint action of the output signals of said detector units, a servo-motor mechanically coupled to the rotor of the synchro to rotate it positively, phase conscious means connected to said synchro rotor for controlling the output torque of the servo-motor, and phase-shifting means connected in the excitation circuit of one of said detector units to shift the phase of the excitation current of said one of said detector units with respect to the excitation current of the other of said detector units, said phase-shifting means being adjustable whereby the algebraic sum of the output signals of the said detector units may be adjusted to provide a corrected indication of the heading of the transporter.

5. The system of claim 4, wherein said phase conscious means is a phase conscious rectifier.

6. The system of claim 4, further comprising an alternating current reference source connected to said phase conscious means, the output of said phase conscious means varying in accordance with the output signals of said detector units.

7. A magnetic compass system comprising a pair of magnetic detector units carried by a transporter having deviating fields, which detector units are arranged one at each of two points at which the deviating fields bear a substantially constant ratio and are parallel to each other, an excitation coil for each detector unit, a single synchro the stator windings of which are connected into the system to be energized by the joint action of the output signals of said detector units, a phase conscious servo motor electrically and mechanically coupled to the rotor of the synchro so that changes in the effective electrical output of the synchro will cause the servo motor to turn the synchro rotor toward a null point, and phase shifting means connected to the excitation coil of one of said detector units to shift the phase of the excitation current of said one of said detector units with respect to the excitation current of the other of said detector units, said phase-shifting means being adjustable whereby the algebraic sum of the output signals of the said detector units may be adjusted to provide a corrected indication of the heading of the transporter.

8. A magnetic compass system comprising a pair of magnetic detector units carried by a transporter having deviating fields, said detector units being arranged one at each of two points at which the deviating fields bear a substantially constant ratio and are parallel to each other, an excitation circuit for each detector unit, a single synchro having a rotor and a stator, said synchro stator having its windings connected to be energized by the joint action of the output signals from said detector units, a servo-motor mechanically coupled to the rotor of the synchro to rotate it positively, phase conscious means having two inputs, the rotor winding of said synchro providing one input and an alternating current reference source providing the other input, the output of said phase conscious means controlling the torque of said servo motor so that changes in the effective electrical output of the synchro will cause the servo motor to turn the synchro rotor into an angular position where the electrical output from the said synchro rotor will cause no torque from the servo motor, and phase-shifting means connected in the excitation circuit of one of said detectors to shift the phase of the excitation current of said one of said detector units with respect to the excitation current of the other of said detector units, said phase-shifting means being adjustable to permit initial balancing of said system to eliminate the effect of said deviation fields.

References Cited in the file of this patent

UNITED STATES PATENTS

| | | |
|---|---|---|
| 2,383,461 | Esval et al. | Aug. 28, 1945 |
| 2,393,670 | White | Jan. 29, 1946 |
| 2,900,736 | Harvey | Aug. 25, 1959 |

FOREIGN PATENTS

| | | |
|---|---|---|
| 775,440 | Great Britain | May 22, 1957 |
| 872,096 | Great Britain | July 5, 1961 |